United States Patent Office  3,702,785
Patented Nov. 14, 1972

3,702,785
LOW-TEMPERATURE CURABLE ARTICLES
Donald P. Knechtges, Grafton, and Bela K. Mikofalvy, Sheffield Lake, Ohio, assignors to The B. F. Goodrich Company, New York, N.Y.
No Drawing. Filed Sept. 14, 1970, Ser. No. 72,107
Int. Cl. D21h 1/40
U.S. Cl. 117—155 UA                                5 Claims

ABSTRACT OF THE DISCLOSURE

Nonwoven fabrics, textiles, papers and other substrates treated with a polymer latex derived predominantly from acrylic esters and/or vinyl esters are curable at low temperatures to obtain optimum or near optimum physical properties. The articles may be coated, impregnated or saturated with the polymer latex.

BACKGROUND OF THE INVENTION

Polymers derived from acrylic esters and other polymerizable ester monomers are useful for many applications where articles such as nonwoven fabrics, textiles, papers or other substrates are coated, impregnated and saturated with the aqueous polymer dispersion. Especially useful for these applications are the polymers which contain reactivity so that the polymers are curable simply by heating, that is, without the use of external curing aids. Heretofore, articles utilizing self-curing polymers were necessarily heated at temperatures of about 300° F. or 325° F. to obtain acceptable cures and optimum physical properties. At these temperatures, however, many of these substrates and polymers discolor even with short cure times. It would be highly advantageous to have articles such as papers, textiles and nonwoven fabrics treated with self-curing polymers which are capable of being cured at temperatures below about 300° F. to obtain optimum or near optimum physical properties with minimum discoloration. Such articles could also be produced at much faster rates and more economically due to lower heat requirements.

SUMMARY OF THE INVENTION

We have now unexpectedly discovered that by coating, saturating or impregnating nonwoven fabrics, textiles, papers and other substrates with certain polymer latices derived predominantly from acrylic esters and/or vinyl esters that the treated articles may be cured at low temperatures to obtain optimum or near optimum physical properties without the use of external curing agents. By curing the treated articles at significantly reduced temperatures discoloring of the articles is minimized and in most instances completely eliminated.

The articles are treated with a polymer latex containing from about 5% to about 75% total solid and which has been maintained at a pH less than about 7 during the polymerization and prior to treating the substrate. The polymer latex contains from about 45% to 94% by weight acrylic ester and/or vinyl ester polymerized with 5% to 35% by weight vinyl halide or vinylidene halide, an $\alpha,\beta$-olefinically unsaturated carboxylic acid and an N-alkylol amide or N-alkoxyalkyl amide derived from an $\alpha,\beta$-olefinically unsaturated carboxylic acid.

DETAILED DESCRIPTION

The articles of the present invention are saturated, coated or impregnated with latex polymers and attain optimum or near optimum physical properties at temperatures substantially lower than 300° F. and often as low as room temperature. It is further advantageous that when the coated, impregnated or saturated articles are cured at these lower temperatures there is little or no discoloration of the article.

Papers which may be treated with the polymer latices and which are curable at low temperatures may be obtained from any bleached or unbleached pulp process or they may be obtained by the unbleached sulfite, bleached sulfite, unbleached sulfate (kraft), semi-bleached and bleached sulfate processes. A wide variety of nonwoven and textile applications are also possible and the materials may be derived from either natural or synthetic fibers such as cotton, wool, silk and the like; rayon (viscose); cellulose esters such as cellulose triacetate; proteinaceous fibers such as those derived from casein; polyamides (nylons) such as those derived from the condensation of adipic acid and hexamethylene diamine or from the self-condensation or caprolactone; polyesters such as polyethyelne glycol terephthalate; olefin polymers such as polyethylene and polypropylene; acrylic fibers containing 85% or more acrylonitrile polymerized with vinyl chloride, vinyl acetate or methacrylonitrile or the modacrylic fibers which contain smaller amounts of acrylonitrile; copolymers of vinyl chloride with vinyl acetate or vinylidene chloride; or the like. Other widely divergent substrates such as metals, wood, leather and poromeric materials, plastics, foams, cork and the like may also be treated in accordance with the present invention and processed at low temperatures to obtain useful articles.

The papers, textiles, nonwovens and other substrates useful for saturation, coating or impregnation are available by any of the known techniques. The papers, for example, can be formed by moving a fine wire screen from an aqeuous suspension of the cellulosic fibers. The non-woven material can be obtained by carding, garnetting, deposition of the fibers from an air stream, deposition from solution, wet layering or the like, depending on the particular fiber or fiber blend being employed and whether the fibers are to be randomly distributed or oriented.

The treatment of the substrates with the polymer latex may be accomplished employing commonly known techniques. For example, to impregnate or saturate the article, it may be dipped or sprayed. Similarly, if the materials are to be coated with the polymer latex this may be accomplished by dipping, spraying or by employing a roller means, spreading knife, brush or the like.

The polymer latices suitable for application to the substrate may also be compounded with known ingredients such as fillers, plasticizers, antioxidants or stabilizers, antifoaming agents or other compounding aids. Also, it may be convenient to add thickeners or bodying agents to the latex to control the viscosity of the latex so as to achieve the proper flow properties for the particular application desired. The latex when applied to the articles will contain from about 5% to about 75% or higher total solids.

The polymer latices useful for the present invention are obtained by the polymerization, either conventionally co-polymerizing the monomers, overpolymerizing or grafting, of (a) an acrylic ester or vinyl ester, (b) about 5 to 35% by weight vinyl halide or vinylidene halide, (c) an $\alpha,\beta$-olefinically unsaturated carboxylic acid, and (d) an N-alkylol amide or N-alkoxyalkyl amide derived from an $\alpha,\beta$-olefinically unsaturated carboxylic acid.

In accordance with the present invention one or more acrylic ester monomers having the formula

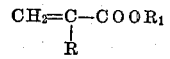

or a vinyl ester monomer of the formula

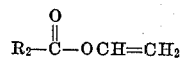

wherein R is a hydrogen or an alkyl radical containing from 1 to 4 carbon atoms, $R_1$ is a hydrocarbon radical containing from 1 to 12 carbon atoms such as alkyl, aryl, cycloalkyl, alkaryl or aralkyl radicals and $R_2$ is an alkyl radical containing from 1 to 6 carbon atoms. Useful acrylic esters and vinyl esters of the above type include ethyl acrylate, methyl acrylate, methyl methacrylate, ethyl methacrylate, 2-ethylhexyl acrylate, 2-ethylhexyl methacrylate, isobutyl methacrylate, cyclohexyl acrylate, phenyl acrylate, vinyl acetate, vinyl butyrate and the like. Polymer latices particularly useful are derived from the alkyl esters of acrylic or methacrylic acid or vinyl acetate, that is, where R is hydrogen or methyl, $R_1$ is an alkyl radical containing from 1 to 8 carbon atoms and $R_2$ is a methyl radical. Other acrylic esters such as glycidyl acrylate, glycidyl methacrylate, ethoxyethyl acrylate, the chloroalkyl acrylates and the cyanoalkyl acrylates may also be employed and are often useful.

Polymerized with the vinyl ester or acrylic ester monomers is a vinyl halide or vinylidene halide monomer corresponding to the structural formula

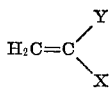

where X is a halogen selected from the group consisting of chlorine, bromine or fluorine and Y is a hydrogen or a halogen the same as defined for X. Vinyl chloride is especially useful monomer for the purpose of the present invention.

Additionally polymerized will be an $\alpha,\beta$-olefinically unsaturated carboxylic acid containing from about 2 to 12 carbon atoms. Acid monomers which may be used include acrylic acid, methacrylic acid, ethacrylic acid, $\alpha$-chloroacrylic acid, $\alpha$-cyanoacrylic acid, crotonic acid, $\beta$-acryloxy propionic acid, sorbic acid, $\alpha$-chlorosorbic acid, hydrosorbic acid, cinnamic acid and the like. Mixtures of two or more of the above-mentioned carboxylic acid monomers may also be employed if desired. In addition to the above-mentioned acid monomers, certain acid monomers containing two or more carboxyl groups such as itaconic acid, citraconic acid, fumaric acid, maleic acid, mesaconic acid, muconic acid, glutaconic acid and the like may also find application in the present process. Acid anhydrides, such as maleic anhydride, wherein the anhydride group is formed by the elimination of a molecule of water from two carboxyl groups located in the same polycarboxylic acid molecule may also be useful. Acrylic acid and methacrylic acid are especially useful monomers for this invention.

Also polymerized as an essential monomer to obtain the low temperature curable polymers useful for the present invention is an N-alkylol amide or N-alkoxyalkyl amide, or mixture thereof. These amide monomers are derived from $\alpha,\beta$-olefinically unsaturated carboxylic acid. Useful amide monomers of the above type have the structural formula

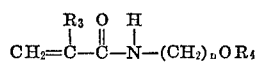

wherein $R_3$ is hydrogen or an alkyl radical containing from 1 to 4 carbon atoms, $R_4$ is hydrogen or an alkyl group containing from 1 to 8 carbon atoms and $n$ is an integer from 1 to 4. Amides of the above type include N-methylol acrylamide, N-methylol methacrylamide, N-ethanol acrylamide, N-propanol acrylamide, N-methoxymethyl acrylamide, N-methoxyethyl acrylamide, N-butoxyethyl acrylamide, N-butoxymethyl methacrylamide and the like. While these monomers are most useful because of their ready availability and low cost, other structurally related polymerizable amides such as N-methylol maleamide, N-methylol maleimide, N-methylol-p-vinyl benzimide, the hydroxyalkyl derivatives of diacetone acrylamide and the like may also be employed. N-methylol acrylamide and N-methylol methacrylamide are specially useful amide monomers.

The polymer compositions obtained in accordance with the present invention may be varied over a wide range and still yield useful articles curable at low temperatures. The acrylic ester and/or vinyl ester will most generally be present from about 45 to 94% by weight based on the total monomers, however, excellent results are obtained when these monomers are present between about 60 and 91% by weight. The acid monomer will be polymerized in an amount between about 0.5 to 5% by weight, and more generally between about 1 and 3% by weight. Similarly, the amide monomer will be present from about 0.5 to 5% by weight with excellent results being obtained when about 1 to 3% by weight of the monomer is present. Included with these monomers is from about 5 to 35% by weight of the vinyl halide or vinylidene halide monomer. In addition to the above-mentioned monomers which are essential if low temperature curable articles are to be obtained, up to about 35% by weight of one or more polymerizable comonomers may also be present.

Polymerizable comonomers useful in the present invention contain a polymerizable double bond and include: conjugated dienes such as butadiene and isoprene; $\alpha$-olefins such as ethylene, propylene, isobutylene, butene-1; vinyl aromatics such as styrene, chlorostyrene and $\alpha$-methyl styrene; alkyl vinyl ethers such as methyl vinyl ether or isobutyl vinyl ether; $\alpha,\beta$-olefinically unsaturated nitriles such as acrylonitrile or methacrylonitrile and cyanoalkyl acrylates; acrylamide, methacrylamide, diacetone acrylamide, N-octyl acrylamide and the like; polyfunctional monomers such as methylenebisacrylamide, ethyleneglycol dimethacrylate, diethyleneglycol diacrylate, divinylbenzene, allyl pentaerythritol and the like. Especially useful polymer latex compositions are obtained when the polymerizable comonomer is present in an amount from about 2% to about 15% by weight. Acrylonitrile and methacrylonitrile are especially useful polymerizable comonomers since they are readily polymerizable with the other monomers used to obtain the present low temperature curable polymers.

A great deal of flexibility is permitted for conducting the polymerizations to prepare the polymers useful for the present invention. Charging procedures, polymerization conditions, emulsifiers and initiators may be widely varied. The polymerizations will generally be conducted at temperatures ranging from about 5° C. to about 100° C. The polymer latices may contain up to as much as 75% by weight total solids.

Polymerizations may be conducted at pH 7 or below. It is most desirable and highly advantageous, however, in order to obtain polymer latices wherein articles treated therewith have optimum low temperature curability that the polymerizations be carried out at pH less than about 5. Similarly, if there is to be any post-polymerization modification of the latex through the use of additives, etc., it is preferable that the pH of the latex be maintained on the acid side, and more preferably at pH 5 or less.

The aqueous medium may be emulsifier free but it is generally preferred that one or more emulsifiers be used in order to obtain stable latices which are essentially free of coagulum. Any of the anionic or nonionic emulsifiers may be employed. Useful anionic emulsifiers include alkali metal or ammonium salts of the sulfates of alcohols having from 8 to 18 carbon atoms, alkali metal or ammonium salts of sulfonated paraffin and petroleum oils, alkali metal or ammonium salts of aromatic sulfonic, alkali metal and ammonium salts of dicarboxylic esters, alkali metal soaps of rosin acids and the like. Useful nonionic emulsifiers include octyl- and nonylphenoxypoly(ethyleneoxy)ethanol and octylphenoxypolyethoxyethanol. When an emulsifier is used it will be present in an amount up to about 10 parts per 100 parts monomer and more preferably from about 1.5 to about 5 parts per 100 parts monomer. It may be advantageous to employ a mixture of emulsifiers which can be selected from different emulsifier groups.

To charge the emulsifier, incremental addition or proportioning may be employed or the entire amount of emulsifier may be charged at the outset of the polymerization.

A polymerization catalyst will generally be employed and may be any compound capable of initiating free radical polymerizations. Initiators such as the various peroxygen compounds including the persulfates, peroxides, hydroperoxides, azo compounds and the like are most useful. The water soluble peroxygen compounds such as hydrogen peroxide and sodium, potassium and ammonium persulfate employed by themselves or in activated redox systems are particularly advantageous for initiating these polymerizations. The amount of initiator will generally range between about 0.1% and 3% by weight based on the total monomers with the initiator being charged entirely at the outset of the polymerization or incrementally or proportionately throughout the run.

Additives such as modifiers and like materials may be included in the polymerization and are often desirable. For example, the use of modifiers such as primary, secondary or tertiary mercaptans may be useful to regulate the polymer molecular weight. Other substances which may be included in the polymerization include buffers, electrolyte salts, carbon black, silica and the like.

The monomers to be polymerized may be charged in accordance with known copolymerization methods. It is also possible to charge one or more of the monomers in increments or by proportioning at a point subsequent to the initial monomer charge so that the latter added monomer(s) are overpolymerized or grafted onto the base polymer. While the invention is not limited to a specific emulsion polymerization method it has been found advantageous to carry out the polymerization using pre-emulsification of the monomers. With this technique, a reactor is charged with an amount of water, a portion of the emulsifier and a portion of the initiator sufficient to initiate the polymerization. The reactor is then heated to a temperature sufficient to start the polymerization and an amount (generally up to about 15%) of a monomer premix containing the monomers, water, emulsifier and any polymerization additives charged to the reactor. After the initial monomer charge has been allowed to react for a period of time, the remainder of the monomer premix is proportioned into the reactor, the rate of proportioning being governed by the monomers being polymerized, polymerization temperature, initiator system and the like. At the completion of the proportioning, more initiator is added to the reactor and latex heated with agitation for an additional period. If an overploymerization is to be carried out the monomers to be overpolymerized will be charged as a monomer emulsion at some point subsequent to the initial monomer charge but prior to the addition of the final initiator charge.

The following examples serve to illustrate the invention more fully. All parts and percentages in the examples stated herein are given on a weight basis.

Since the ability of a polymer saturated paper substrate to be cured to optimum or near optimum physical properties is generally accepted throughout the industry as a measure of the curability of the polymer latex for other related applications in textile and nonwoven fabric areas, the examples were run using saturated paper substrates. With such saturated papers the development of the wet tensile strength of the paper is considered as one of the best indicators of the degree of cure. When the wet tensile strength reaches about 40% to 50% of the dry tensile value and is at least 75% of the optimum wet tensile value the cure is an acceptable one.

EXAMPLE I

A pressure reactor was charged with 195 parts water, 0.3 part sodium sulfate and 0.3 part potassium persulfate. The reactor was then evacuated three times to about 100 mm. mercury heated to about 50° C. and charged with 4% of a monomer premix comprised of 30 parts water, 4.0 parts sodium lauryl sulfate, 0.3 part of a mercaptan modifier, 61 parts ethyl acrylate, 5 parts acrylonitrile, 2 parts acrylic acid, 2 part N-methylol acrylamide and 30 parts vinyl chloride. After the initial portion of the monomer premix was allowed to react for about 30 minutes the remainder of the monomer premix was proportioned into the reactor over a period of about 6 hours. When the proportioning was completed 0.05 part potassium persulfate dissolved in 5 parts water was charged and the latex agitated at 50° C. for an additional period of about 10 hours to insure complete monomer conversion. The reactor was then vented, allowed to cool and the latex filtered. The latex which had a pH of 2.4 and contained 31.0% total solids was essentially free of coagulum and had excellent stability.

The latex was diluted with water to about 15% total solids and 10 mil flat paper floated on the latex for 10 seconds on each side. The saturated paper was then drip-dried at room temperature and cured over a range of temperatures from 225° F. to 325° F. Dry, wet and solvent tensiles were measured on cured 1" x 6" paper samples at a pull rate of 5 cm./min. The papers were soaked in water for a minimum of 16 hours prior to the wet tensile determination and to determine the solvent tensile the samples were soaked in perchloroethylene for 20 minutes prior to pulling. Tensile values (1 lb./in.) obtained were as follows:

|  | Dry tensile | Wet tensile | Percent of dry tensile | Solvent tensile |
|---|---|---|---|---|
| 5 min. cure at 225° F | 66 | 30 | 45.5 | 36 |
| 5 min. cure at 275° F | 67 | 36 | 54 | 43 |
| 3 min. cure at 325° F | 62 | 31 | 50 | 41 |

From the above tensile data it is evident that a highly acceptable cure is obtained at 225° F. with optimum cure being reached at 275° C. It is significant that these low temperature cures were achieved without the use of external curing agents and also that there was no observable discoloration of the paper samples cured at 225° F. and 275° F. Curing for just 3 minutes at 325° F. resulted in noticeable visual discoloration and a marked decrease in light reflectance of the papers.

When a polymer latex of similar composition was employed to coat a fabric wall covering the physical properties obtained after curing at 250° F. were superior to those obtained for an identical fabric covering saturated with a conventional latex polymer and cured at 300° F.

EXAMPLE II–V

A series of polymerizations were conducted in accordance with the general procedure described in Example I to prepare polymer latices suitable for impregnation of papers, textiles and nonwoven substrates and capable of being cured at low temperatures. The polymer compositions and polymerization recipes for the examples are set forth in Table I.

TABLE I

| Example | II | III | IV | V |
|---|---|---|---|---|
| Monomers (parts): | | | | |
| Vinyl chloride | 5 | 20 | 20 | 30 |
| Ethyl acrylate | 91 | | | 14 |
| 2-ethylhexyl acrylate | | | 52 | |
| Ethoxyethyl acrylate | | | | 50 |
| Vinyl acetate | | 25 | | |
| Acrylonitrile | | | 77 | 3 |
| Acrylic acid | 2 | | 2 | 1.2 |
| N-methylol acrylamide | 2 | 1 | 1 | 1.8 |
| Water (total parts) | 230 | 230 | 230 | 96 |
| Modifier (total parts) | 0.3 | 0.3 | 0.3 | |
| Emulsifier (total parts): | | | | |
| Sodium salt of lauryl sulfate | 4 | 4 | 4 | |
| Nonylphenoxy poly(ethyleneoxy) ethanol | | | | 2.5 |
| Straight chain divinylbenzene sodium sulfonate | | | | 2.5 |
| Electrolyte (total parts): Tetrasodium-pyrophosphate | | | | 0.4 |
| Initiator (total parts) Potassium persulfate | 0.35 | 0.35 | 0.35 | 0.5 |
| Latex pH | 3.1 | 3.1 | 3.3 | 2.8 |
| Latex total solids (percent) | 29.8 | 30.9 | 28.4 | 51.8 |

The polymer latices obtained all had excellent stability, were essentially free of coagulum and were useful for impregnation, saturation and coating applications. Paper saturated with these latices were curable to optimum or near optimum physical properties at temperatures significantly lower than 325° F. For example, the following tensile data was obtained for papers saturated with the polymer latices of Examples II and III:

|  | Dry tensile | Wet tensile | Solvent tensile |
|---|---|---|---|
| Paper plus Latex II: | | | |
| 5 min. cure at 225° F | 46 | 20 | 21 |
| 5 min. cure at 275° F | 50 | 34 | 35 |
| 3 min. cure at 325° F | 51 | 30 | 38 |
| Paper plus Latex III: | | | |
| 5 min. cure at 225 F | 38 | 11 | 19 |
| 5 min. cure at 275° F | 42 | 20 | 21 |
| 3 min. cure at 325 F | 42 | 21 | 24 |

Excellent cures with little or no discoloration of the papers were obtained at 275° F. with both of the above polymer latices.

We claim:
1. An article comprising a substrate impregnated with a polymer consisting essentially of about 45% to 94% by weight, based on the total monomers, of (a) an acrylic ester of the formula

$$CH_2=C-COOR_1$$
$$\quad\quad |$$
$$\quad\quad R$$

or a vinyl ester of the formula $$R_2-\overset{O}{\overset{\|}{C}}-OCH=CH_2$$

wherein R is hydrogen or an alkyl radical containing from 1 to 4 carbon atoms, $R_1$ is a hydrocarbon radical containing from 1 to 12 carbon atoms and $R_2$ is an alkyl radical containing from 1 to 6 carbon atoms, or a mixture of said monomers; from 5% to 35% by weight of (b) vinyl chloride; about 0.5% to 5% by weight of (c) an $\alpha,\beta$-olefinically unsaturated carboxylic acid containing from 2 to 12 carbon atoms; from 0.5% to 5% by weight of (d) an N-alkylol amide or N-alkoxyalkyl amide of the formula $$CH_2=\overset{R_3}{\overset{|}{C}}-\overset{O}{\overset{\|}{C}}-\overset{H}{\overset{|}{N}}-(CH_2)_nOR_4$$

wherein $R_3$ is hydrogen or an alkyl radical containing from 1 to 4 carbon atoms, $R_4$ is hydrogen or an alkyl group containing from 1 to 8 carbon atoms and $n$ is an integer from 1 to 4; and up to about 35% by weight of a monomer containing a polymerizable double bond selected from the group consisting of $\alpha$-olefins, vinyl aromatics, alkyl vinyl ethers, $\alpha,\beta$-olefinically unsaturated nitriles and acrylamides.

2. The article of claim 1 wherein (a) is vinyl acetate or a lower alkyl ester of acrylic acid or methacrylic acid wherein the alkyl substituent contains from 1 to 8 carbon atoms, (b) is vinyl chloride, (c) is acrylic acid or methacrylic acid and (d) is N-methylol acrylamide or N-methylol methacrylamide.

3. The article of claim 1 wherein (a) is present in an amount between about 60% to 91% by weight with about 1 to 3% by weight (c) and 1 to 3% by weight (d).

4. The article of claim 3 wherein the copolymerized comonomer is acrylonitrile or methacrylonitrile present from about 2% to 15% by weight.

5. The article of claim 4 wherein the substrate is a nonwoven fabric, textile or paper.

References Cited

UNITED STATES PATENTS

| 3,231,533 | 1/1966 | Garrett et al. | 117—140 X |
| 3,457,209 | 7/1969 | Mikofaluy | 117—140 X |
| 3,539,434 | 11/1970 | Spaulding | 117—140 X |
| 3,352,710 | 11/1967 | Wolf et al. | 117— 140 |
| 3,344,103 | 9/1967 | Eilbeck et al. | 117—140 X |
| 3,577,554 | 5/1971 | Parrish et al. | 260—29.6 X |

WILLIAM D. MARTIN, Primary Examiner

M. R. LUSIGNAN, Assistant Examiner

U.S. Cl. X.R.

117—132 C, 138.8 E, 138.8 F, 138.8 N, 138.8 UA, 140 A, 141, 143 A, 145, 148, 161 UT, 161 UN, 161 UC